United States Patent
Hanko et al.

(10) Patent No.: US 6,230,296 B1
(45) Date of Patent: May 8, 2001

(54) METHOD AND APPARATUS FOR PROVIDING ERROR CORRECTION

(75) Inventors: James G. Hanko, Redwood City; Alan T. Ruberg, Foster City, both of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/063,342

(22) Filed: Apr. 20, 1998

(51) Int. Cl.$^7$ .................................................. G08C 25/02
(52) U.S. Cl. .............................. 714/748; 345/23; 345/117
(58) Field of Search ...................... 340/825.01; 399/83; 358/115; 709/224; 714/746, 748; 345/23

(56) References Cited

U.S. PATENT DOCUMENTS

| | | | |
|---|---|---|---|
| 4,692,761 | * 9/1987 | Robinton | 340/825.01 |
| 5,260,742 | * 11/1993 | Kikkawa | 399/83 |
| 5,291,585 | 3/1994 | Sato et al. | 709/301 |
| 5,335,320 | 8/1994 | Iwata et al. | 395/704 |
| 5,345,550 | 9/1994 | Bloomfield | 395/353 |
| 5,347,627 | 9/1994 | Hoffmann et al. | 395/334 |
| 5,384,911 | 1/1995 | Bloomfield | 395/333 |
| 5,412,772 | 5/1995 | Monson | 345/335 |
| 5,414,806 | 5/1995 | Richards | 395/135 |
| 5,423,034 | 6/1995 | Cohen-Levy et al. | 707/10 |
| 5,430,836 | 7/1995 | Wolf et al. | 395/335 |
| 5,436,637 | 7/1995 | Gayraud et al. | 345/116 |
| 5,448,695 | 9/1995 | Douglas et al. | 395/347 |
| 5,461,399 | 10/1995 | Cragun | 345/145 |
| 5,461,710 | 10/1995 | Bloomfiled et al. | 395/349 |
| 5,473,745 | 12/1995 | Berry et al. | 395/340 |
| 5,491,784 | 2/1996 | Douglas et al. | 395/352 |
| 5,493,638 | 2/1996 | Hooper et al. | 395/135 |
| 5,509,116 | 4/1996 | Hiraga et al. | 707/1 |

(List continued on next page.)

FOREIGN PATENT DOCUMENTS 0 661 634 A2   5/1995   (EP) .

OTHER PUBLICATIONS

Ronald L. Johnston, "The Dynamic Incremental Compiler of APL/3000" Proceedings of the API '79 Conference, published as APL Quote Quad, 9(4), p 82–87.

Leo J. Guibas et al., "Compilation and Delayed Evaluation in APL," Fifth Annual Symposium on Principles in Programming Languages, p 1–8, 1978.

Gleen Krasner "The Smalltalk–80 Virtual Machine" BYTE Publications Inc., Aug. 1991, pp 300–320.

*Primary Examiner*—Albert De Cady
*Assistant Examiner*—David Ton
(74) *Attorney, Agent, or Firm*—The Hecker Law Group

(57) ABSTRACT

The invention is directed to an error correction scheme used in a computer system where data is provided from a service to a terminal. The data is dynamically changing, and the user is interested more in a final or current state of the data than in intermediate states. Data is provided in a stream of blocks with sequential "sequence" numbers associated with each block. The invention assumes that the data provider transmits data blocks in order of sequence. The terminal tracks the sequence numbers of incoming blocks. When the terminal finds that one or more blocks have been skipped or are missing, the terminal sends a request to the central source for update data. Unlike prior art systems, which request that the missing block or blocks be re-sent, the present invention requests that the information contained in the missing command be provided, for example the current data at the display area associated with the missing block. The central source maintains the current data state of all display areas, and so sends a data block containing the requested data. In the meantime, the terminal continues to receive and display all received data blocks without waiting for the update request to be filled. This differs from many prior art schemes where display is halted until replacement data is received.

26 Claims, 9 Drawing Sheets

U.S. PATENT DOCUMENTS

| | | | |
|---|---|---|---|
| 5,526,517 | 6/1996 | Jones et al. | 707/8 |
| 5,544,288 | 8/1996 | Morgan et al. | 395/342 |
| 5,546,519 | 8/1996 | Berry | 395/326 |
| 5,548,702 | 8/1996 | Li et al. | 395/346 |
| 5,550,968 | 8/1996 | Miller et al. | 395/332 |
| 5,559,942 | 9/1996 | Gough et al. | 345/349 |
| 5,564,003 | 10/1996 | Bell et al. | 395/326 |
| 5,566,330 | 10/1996 | Sheffield | 707/4 |
| 5,570,462 | 10/1996 | McFarland | 395/136 |
| 5,572,643 | 11/1996 | Judson | 709/218 |
| 5,577,172 * | 11/1996 | Vatland et al. | 358/115 |
| 5,664,091 | 9/1997 | Keen | 714/18 |
| 5,694,603 | 12/1997 | Reiffin | 709/107 |
| 5,694,604 | 12/1997 | Reiffin | 709/107 |
| 5,933,602 * | 8/1999 | Grover | 709/224 |

\* cited by examiner

|   | A | B | C | D |
|---|---|---|---|---|
| 1 | R | R | R | R |
| 2 | R | R | R | R |
| 3 | R | R | R | R |
| 4 | R | R | R | R |

T0

| B | B | B | B |
|---|---|---|---|
| B | R | R | R |
| R | R | R | R |
| R | R | R | R |

T1

| B | B | B | B |
|---|---|---|---|
| B | R | R | R |
| R | R | R | R |
| R | R | R | R |

T2

| B | B | B | B |
|---|---|---|---|
| B | B | B | B |
| B | B | B | B |
| B | B | B | B |

|   | A | B | C | D |
|---|---|---|---|---|
| 1 | R | R | R | R |
| 2 | R | R | R | R |
| 3 | R | R | R | R |
| 4 | R | R | R | R |

T0

|   |   |   |   |
|---|---|---|---|
| B | B | B | B |
| B | R | R | R |
| R | R | R | R |
| R | R | R | R |

T1

|   |   |   |   |
|---|---|---|---|
| B | B | B | B |
| B | R | R | R |
| R | R | R | R |
| R | R | R | R |

T2

|   |   |   |   |
|---|---|---|---|
| B | B | B | B |
| B | B | B | B |
| B | B | B | B |
| B | B | B | B |

T3

|   |   |   |   |
|---|---|---|---|
| G | G | G | G |
| G | G | G | G |
| G | G | G | G |
| G | G | G | G |

|   | A | B | C | D |
|---|---|---|---|---|
| 1 | R | R | R | R |
| 2 | R | R | R | R |
| 3 | R | R | R | R |
| 4 | R | R | R | R |

T0

|   |   |   |   |
|---|---|---|---|
| B | B | B | B |
| B | R | B | B |
| B | B | B | B |
| B | B | B | B |

T1

|   |   |   |   |
|---|---|---|---|
| B | B | B | B |
| B | B | B | B |
| B | B | B | B |
| B | B | B | B |

METHOD AND APPARATUS FOR PROVIDING ERROR CORRECTION

BACKGROUND OF THE INVENTION

1. Field of the Invention

This invention relates to the field of error correction in computer systems.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java, JavaBeans, HotJava and all Java-based trademarks and logos are trademarks or registered trademarks of Sun Microsystems, Inc. in the United States and other countries.

2. Background Art

In a computer system data is typically generated by a data source and provided to a data consumer, or terminal. In some computer systems, the data consumer is only interested in a final or current state of some data rather than the intermediate steps traversed to reach the final, or current state. One such consumer of data is a display means for display of information to a user. Sometimes portions of data can be lost or dropped when moving from the source to the display, resulting in an error condition. It is necessary to correct the error condition so that correct data can be displayed. Existing schemes for error correction interrupt and delay the display of data, inhibiting performance of the computer system.

In some systems, a data source causes the display of data to be effected by sending a series of commands to a display generator (in the present application, the display generator is referred to as the terminal). Each command in the series has an associated sequence number and the sequence numbers are in numerical sequence with no gaps in the numbering. When the terminal receives the commands, one of the things the terminal does is to examine the sequence numbers of each command to see if it is the expected next sequence number. If the terminal receives a command that has an out of order sequence number, there is an assumption that the commands whose sequence numbers are between the sequence number of the last received command and the sequence number of the out of order command are missing. In a typical prior art scheme, the terminal stops generating display data until the missing commands are provided.

An example of the operation of one prior art scheme is illustrated in FIG. 2. FIG. 2 consists of a 4×4 grid of pixels. This is a subset of the entire display area used for purposes of example. The grid consists of columns A, B, C, and D, and rows 1, 2, 3, and 4. Pixel locations are thus identified by their column and row number, e.g. pixel B-2 is the second pixel in the second row, pixel C-4 is the third pixel in the fourth row, and so on.

Consider the situation where the display area is all one color, and it is desired to change the display to a second color. In FIG. 2 at time T0, all of the pixels are one color, as shown by the "R" in each grid box. A series of commands are received from a source that is writing to that particular display area. The description assumes one command for each pixel for purposes of the example, but in reality, a single command could initiate the drawing of multiple pixels. The commands in the example of FIG. 2 are to change each pixel to the color blue. At time T1, assume that the terminal has received commands with the following sequence numbers, C-1, C-2, C-3, C-4, C-5, C-7, C-8, C-9, C-10, C-11, C-12, C-13, C-14, C-15, and C-16. In other words, command sequence number C-6 is missing.

In the prior art, the commands of the correctly received commands C-1 through C-5 are executed so the display appears as is shown at time T1. However, when the next command sequence number C-7 appears, the prior art system stops to request that the missing command be re-sent by the source. Even though the subsequent commands C-7 through C-16 are available, the prior art system does not execute the commands, so that the display remains only partially updated. The display thus remains at time T2 the same as at time T1. Finally, at time T3, the terminal has received the missing block C-6 and executes the commands for C-6 and previously received commands C-7 through C-16 so that the display new displays all blue pixels as at time T3 of FIG. 2.

In operation, the error correction scheme of the example of FIG. 2 causes noticeable delays and hesitation in the display of data. To a user, it appears as if the computer is slow or temporarily inoperative. Such an experience is undesirable.

Another example of how the prior art error correction scheme causes unnecessary delay is illustrated in FIG. 3. In this example, the pixels are being changed from red to blue to green. At time T0, all of the pixels are red. The terminal then receives commands to change the pixels to blue, followed by commands to change the pixels to green. As in the example of FIG. 2, command sequence number C-6 is missing, so that at time T1, the display has only changed the first row of pixels from red to blue, and the first pixel on the second row. The remaining pixels remain red. Again the terminal requests the missing data sequence block. Meanwhile, commands C-17 through C-32 have been received with commands to turn the pixels from blue to green. However, because the terminal is still waiting for the missing command block, the display remains at time T2 as it did at time T1.

When the missing block is received, the terminal continues to execute the commands in order, so that at time T3, all pixels are changed to blue pixels. Finally, at time T4, the terminal has executed commands C-17 through C-32 and has changed the pixels from blue to green. A disadvantage of the "stop and wait" system of the prior art is that updating the display comes to a halt while the terminal requests data from the source. To a user, it can appear that the display has "frozen" or that there is a buffering of response to user commands. This limits the user experience and prevents it from being a substantially instantaneous interaction.

SUMMARY OF THE INVENTION

The invention is directed to an error correction scheme used in a computer system where data is provided from a central source to a terminal. The data is dynamically changing, and the user is interested more in a final or current state of the data than in intermediate states. Data is provided in a stream of blocks with sequential "sequence" numbers associated with each block. The invention assumes that the data provider transmits data blocks in order of sequence. The terminal tracks the sequence numbers of incoming blocks. When the terminal finds that one or more blocks have been skipped or are missing, the terminal sends a request to the central source for update data. Unlike prior art systems, which request that the missing block or blocks be re-sent, the present invention requests that the information contained in the missing command be provided, for example the current data at the display area associated with the missing block. The central source maintains the current data state of all display areas, and so sends a data block containing the requested data. In the meantime, the terminal continues to receive and display all received data blocks without waiting for the update request to be filled. This differs from many prior art schemes where display is halted until replacement data is received.

BRIEF DESCRIPTION OF THE DRAWINGS

FIG. 2 illustrates one example of prior art correction and display of data.

FIG. 3 illustrates another example of prior art correction and display of data.

FIG. 4 illustrates an example of the correction and display of data using the present invention.

FIG. 5 illustrates another example of the correction and display of data using the present invention.

DETAILED DESCRIPTION OF THE INVENTION

Figure 1:
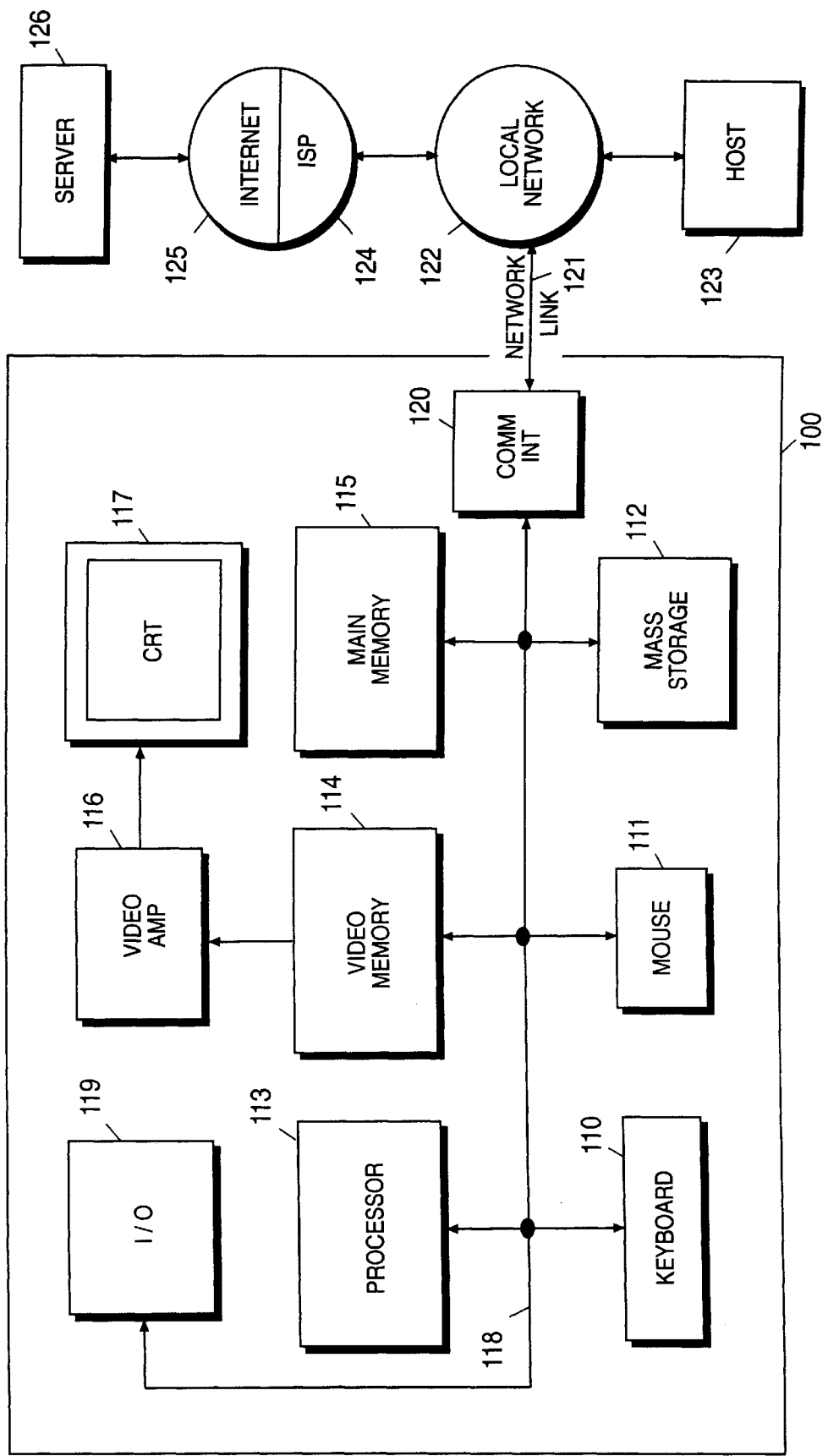
FIG. 1 is a block diagram of an example computer system that can be used with the present invention.

The invention is a method and apparatus for providing error correction. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

The invention is applied to a computer system consisting of one or more data sources, referred to herein as data services, communicating data to one or more terminals. For purposes of this invention, the interaction between a single service and a single terminal will be used as an example. Although the present invention is described in terms of a display terminal, it will be apparent to one skilled in the art that the invention may be applied in other situations where only the final or current state is desired at the data consumer.

The service in the invention sends commands to the terminal to cause display data to be produced on the terminal display. These commands may consist of display data and display address locations, or any other suitable data to cause a terminal to draw display data. In the invention, these commands are sent to the terminal as a series of data blocks. Using well known techniques, each data block that a service sends has an associated sequence number. The system constrains the service to send the blocks in correct order, that is, so that the numbers of the transmitted blocks are in sequential order.

The terminal receives data blocks and follows the commands contained therein to generate a display. Each data block contains one or more commands that instruct the terminal to draw at an associated location on the terminal display. At the same time, the service maintains a "true" copy of the display in memory. (This may be a virtual buffer or an actual physical buffer). The true copy is a current display image and is updated at the service end so that it corresponds to any instructions being transmitted to the terminal. That is, the true copy should be identical to the image displayed at the terminal, assuming all of the commands from the service to the terminal have been correctly received and executed at the terminal.

The terminal tracks the sequence numbers of incoming data. When a gap appears in the sequence, the terminal sends a request for the current data associated with the display location of that sequence block to the service. The terminal also keeps a "checklist" of the sequence block that was unavailable. When the service sends a new block of data that represents the current state of the display area whose sequence block had been missing, the service informs the terminal that the terminal is now up to date at that location. In some cases, the service may already have provided the current data for the display location in a subsequent block but prior to receiving the notice of the missing sequence block. In that case, the service informs the terminal that the terminal has already received the current display data.

When the terminal has received the current display data associated with a display area of a missing sequence block, or when the terminal has been informed that it has already received the current data, it can update its checklist and remove the reference to that display area. The terminal periodically checks its checklist and sends repeat requests for entries for which the terminal has not received current display data.

In the present invention, it should be noted that the request for error correction is not a request to re-send the sequence block of data that was not received. Rather, the request for error correction is to send the data that should be currently displayed at the display location associated with the missing sequence block.

The present invention operates on an assumption that it is preferable to continue to update a display quickly, even though some data may be temporarily incorrect, than to intermittently update a display with completely correct data. The invention has particular application in situations where display data is dynamic, but a current state or final state is considered of greater interest than any intermediate states. In addition, the invention assumes that small errors are likely to be undetected or undetectable by a human user of a terminal. An error in one or a few pixels is not likely to be noticed by a human user, as long as the majority of the display is performing as expected. The invention also works in any system where a user is interested in the most recent snapshot of state and which the recipient user will not return, that is, a system that is read only. For example, stock quote services are read only services where the current state information is of most interest. The system provides a scheme where the most recent information is sent when there is an error.

Figure 5:
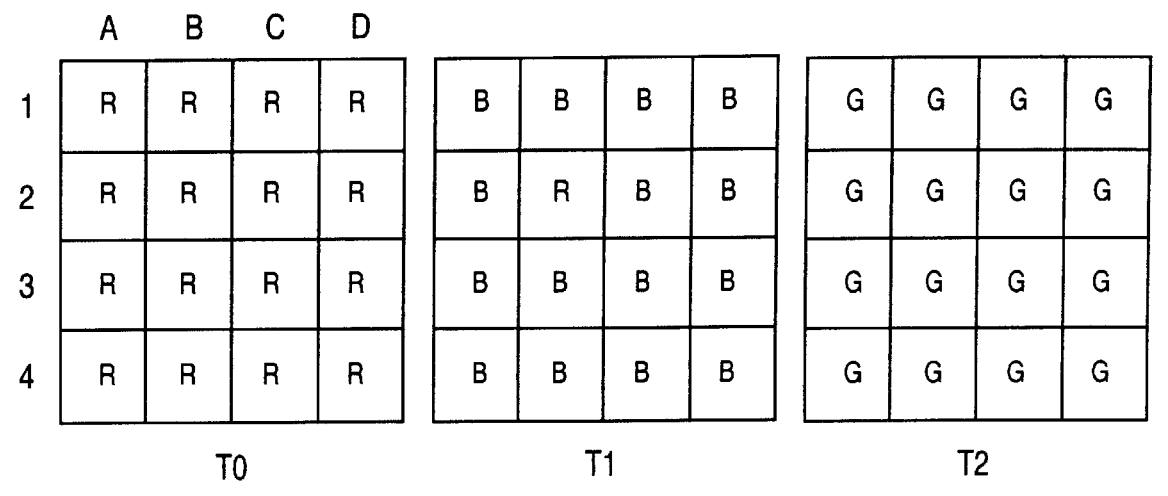

The operation of the present invention can be seen by reference to FIGS. 4 and 5. These present two cases of operation similar to those presented in the example of FIGS. 2 and 3. In the first case of FIG. 4, all of the pixels in a region are changed from red to blue, but one command block is lost. In the second case of FIG. 5, all of the pixels in a region are changed from red to blue to green, but a command for changing one pixel from red to blue is lost.

Referring first to FIG. 4, at time T0 all of the pixels are red. The terminal then receives commands C-1 through C-5 to change the pixels of the first row and the first pixel of the second row to blue. Command C-6 is missing. The terminal notes in a status area that command C-6 is missing and sends a request for the current data corresponding to the display area associated with command C-6. However, the terminal continues executing subsequently received commands C-7 through C-16. As a result the display appears as at time T1, with all of the pixels changed to blue except at location B2. A single pixel is a relatively small area for the human eye to detect, so that the user may not even notice that a part of the display has not been updated. In many cases, the missing data may be in an area that is not uniform, making it even more difficult to notice that a small region has not been updated. Because of this, the user is provided with continuous updates (although not necessarily complete) sufficient to provide a satisfactory experience.

When the service receives the request from the terminal, the service checks its true copy of the display area associated with the missing sequence block. In this case the service determines that the pixel has been changed from red to blue so the service sends a command to the terminal to change that pixel to blue. The terminal executes the command so that the display appears as at time T2, with all pixels now blue.

Another illustrative example is that of FIG. 5. This example perhaps more closely approximates typical display update problems when the display is more dynamic. At time T0 all pixels are red. The terminal then receives commands C-1 through C-5 and changes the appropriate pixels to blue. Again the terminal detects an out of sequence command when it receives command C-7, so the terminal sends a request for correction for command C-6. However, the terminal continues executing commands C-7 through C-16, changing the remainder of the second row of pixels, and all of the third and fourth rows of pixels from red to blue so that the display appears as at time T1. Meanwhile, before the service has responded to the request for correction, commands C-17 through C-32 have been forwarded to the terminal, with commands to change the pixels to green. Even while waiting for the response to the request for correction, the terminal continues to execute all "in sequence" commands and changes all pixels to green. After execution of those commands, the display appears as at time T2 of FIG. 5. Thus, using the present scheme, the display is accurate even though there has as yet been no response to the request for correction. When the service receives the request for correction, the service informs the terminal that the terminal has already received the current data for that location. (Alternatively, the service can re-send the current data for that display location). The terminal then removes the request from its checklist.

Figure 7:
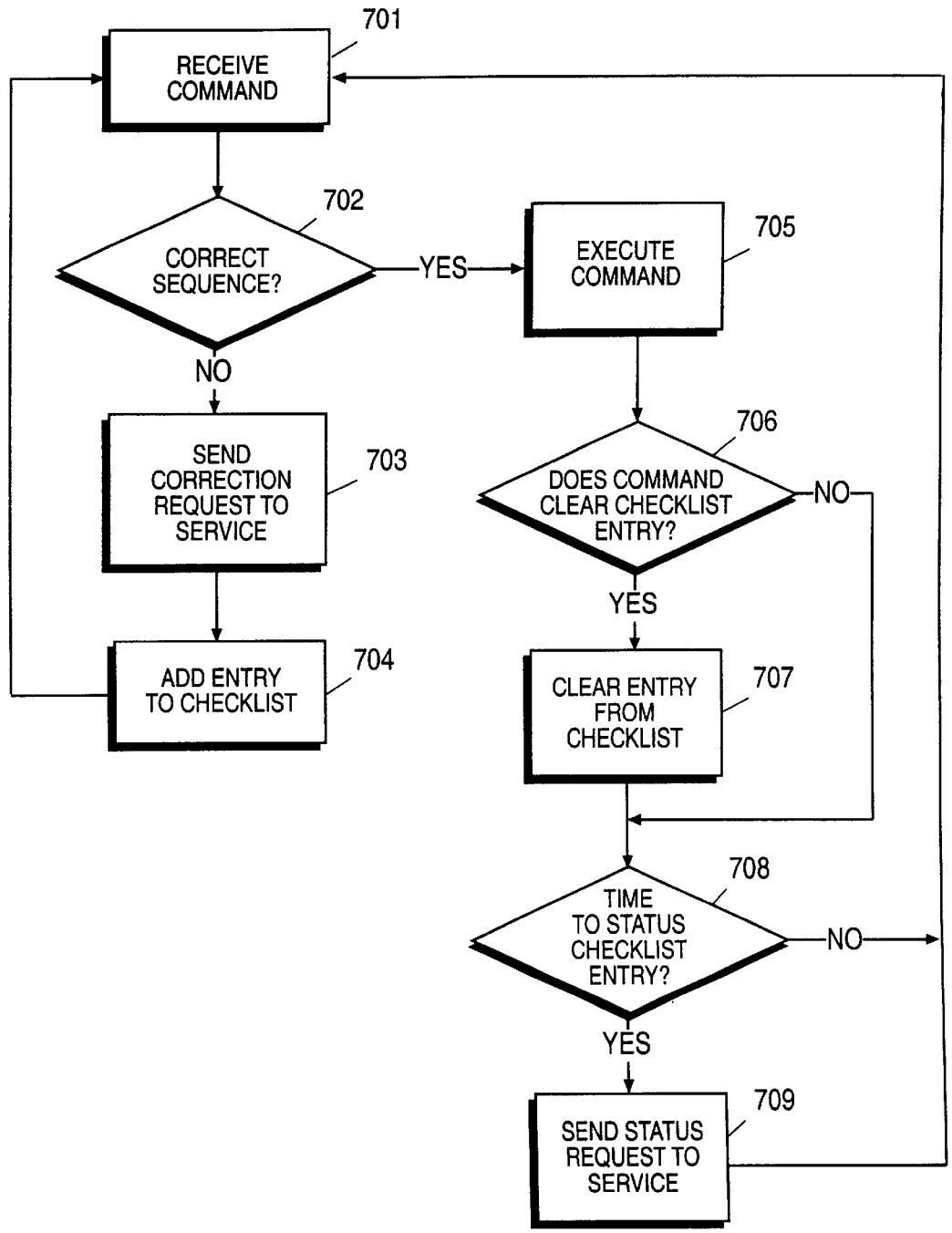
FIG. 7 is a flow diagram illustrating the operation of a terminal of the present invention.

A flow diagram of the operation of the error correction scheme of the present invention is illustrated in FIG. 7. At step 701 the terminal receives a command. At decision block 702 the argument "Correct sequence?" is made. If the argument is false, meaning the sequence number of the received command was not the next expected sequence number, the terminal proceeds to step 703. At step 703 the terminal sends a request for correction to the service. At step 704 the terminal adds an entry to a checklist for the missing command. The terminal then returns to step 701 to await the next command, incrementing a count of the sequence number so it can compare the next received command to its expected sequence number.

If the argument at decision block 702 is true, meaning that the command has the expected next sequence number, the terminal proceeds to step 705 and executes the command. After execution of the command, the terminal proceeds to decision block 706. At decision block 706 the argument "Does command clear checklist entry?" is made. This is to determine if the command was in response to an earlier request for correction. If the argument is false, the terminal proceeds to decision block 708. If the argument is true, the terminal clears the appropriate entry from the checklist at step 707. In one embodiment, the invention clears all checklist entries up to a particular sequence number. The service informs the terminal that all errors up to that sequence number have been, or will be, repaired.

At decision block 708 the argument "Time to status checklist entry?" is made. This is to determine if any of the entries in the checklist are old enough that a status check should be made. If the argument at decision block 708 is false, the terminal returns to step 701. If the argument is true, the terminal sends a status request for the appropriate checklist entry or entries to the service at step 709 and returns to step 701. It should be noted that the activity of steps 708 and 709 can be a separate interrupt driven or periodic process.

Figure 8:
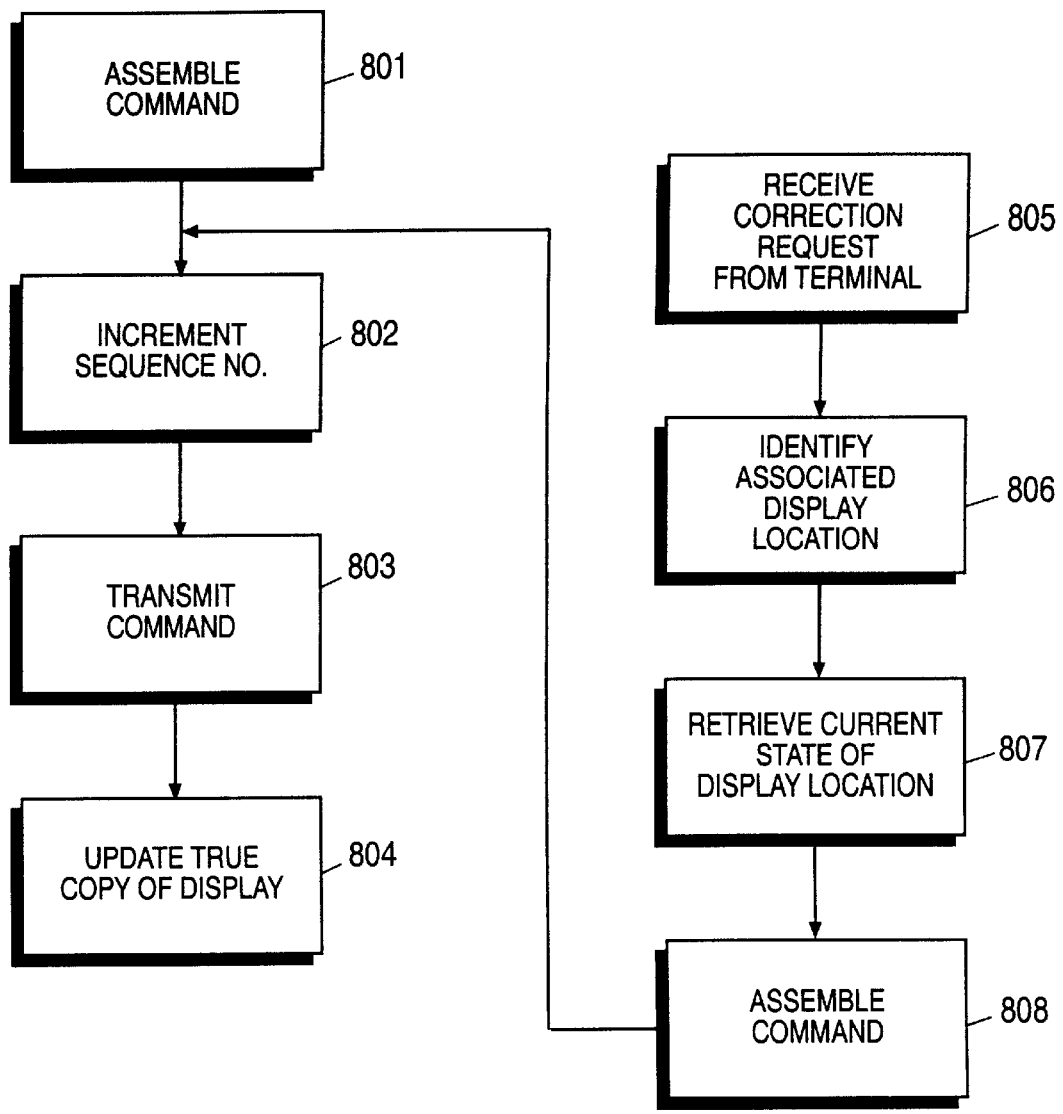
FIG. 8 is a flow diagram illustrating the operation of a service of the present invention.

A flow diagram of the operation of a service in the present invention is illustrated in FIG. 8. Two processes are described in FIG. 8, a command assembly process, and an error correction process. At step 801, the service assembles a command to be transmitted to a terminal. At step 802, the sequence number is incremented and associated with the command. At step 803 the command and sequence number are transmitted to the terminal. At step 804, the local true copy of the display that is maintained by the service is updated. This true copy may be maintained in a physical buffer, a virtual buffer, or in mass storage.

Steps 805 through 808 describe the process for dealing with error correction requests from a terminal. At step 805 the service receives a correction request from a terminal. The correction request identifies a missing sequence number or numbers. At step 806, the service determines the display region or regions that would have been affected by the missing command or commands. At step 807 the service retrieves the current data at those display regions from the true copy of the display. At step 808 service assembles a command for the requesting terminal with the current data and proceeds to step 802.

The present invention also has application in situations other than when new data is being provided by the service. For example, the terminal may be asked to copy data from one display area and paste it to another display area. Should the data to be copied be dropped or unavailable, the terminal can request the data from the service. (Note that in this "stateless" copy situation, the terminal is not asking for the replacement of data associated with a missing sequence number command.)

Embodiment of Computer Execution Environment (Hardware)

An embodiment of the invention can be implemented as computer software in the form of computer readable code executed on a general purpose computer such as computer 100 illustrated in FIG. 1, or in the form of bytecode class files executable within a Java™ runtime environment running on such a computer. A keyboard 110 and mouse 111 are coupled to a bidirectional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bidirectional system bus 118 represents such I/O elements as a printer, A/V (audio/video) I/O, etc.

Computer 100 includes a video memory 114, main memory 115 and optionally, mass storage 112, all coupled to bi-directional system bus 118 along with keyboard 110, mouse 111 and processor 113. The mass storage 112, if used, may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor, or a SPARC™ microprocessor from Sun Microsystems™, Inc. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Alternatively, the video memory may be used to drive a flat panel or liquid crystal display (LCD) or any other suitable data presentation device. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links, modems or cable modems are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120. In accord with the invention, one such downloaded application is the apparatus for error correction described herein.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

Human Interface Device Computer System

The invention also has application to computer systems where the data to be displayed is provided through a network. The network can be a local area network, a wide area network, the internet, world wide web, or any other suitable network configuration. One embodiment of the invention is used in computer system configuration referred to herein as a human interface device computer system.

Figure 6:
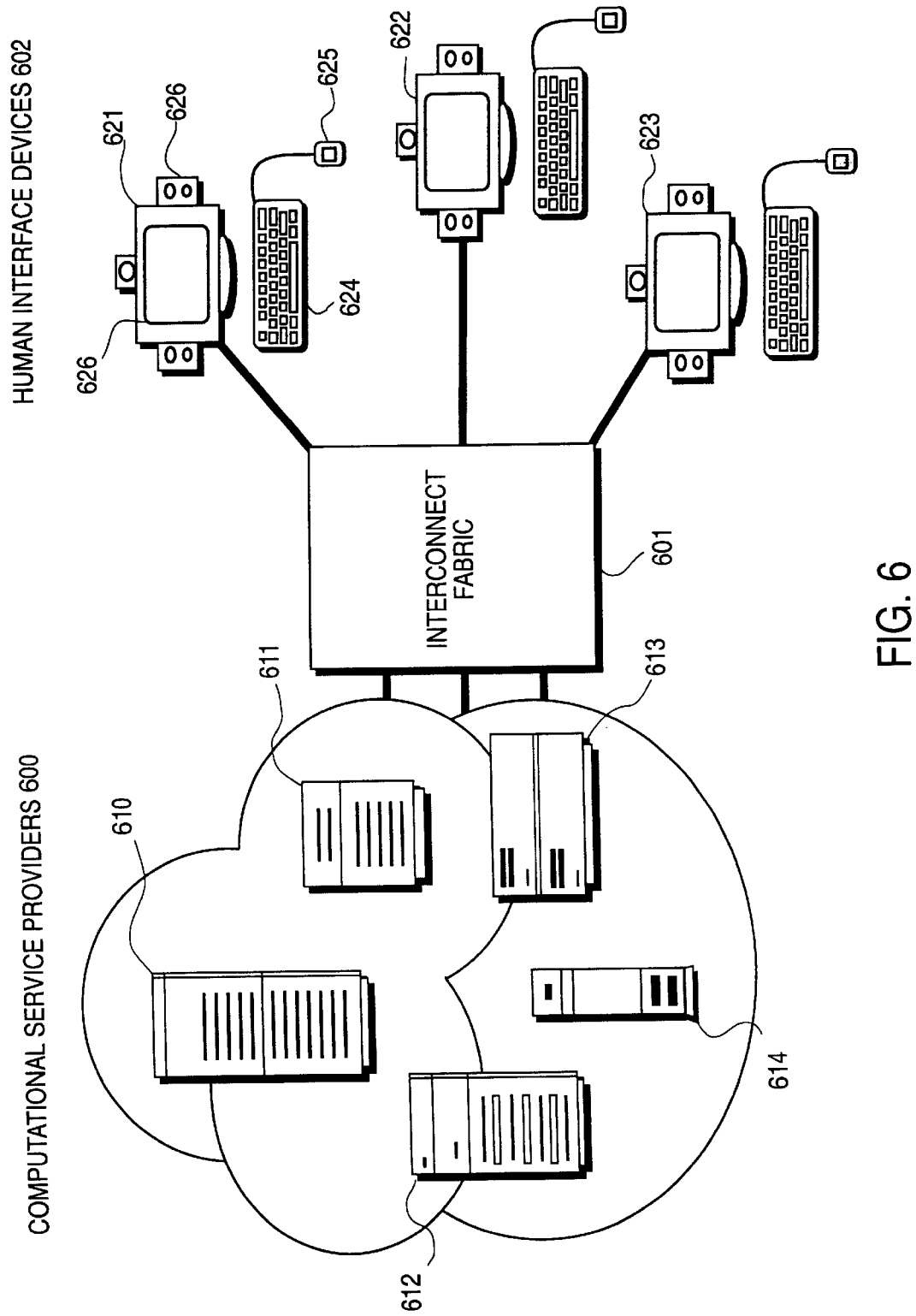
FIG. 6 is a block diagram of a computer system that can be used with the present invention.

In this system the functionality of the system is partitioned between a display and input device, and data sources or services. The display and input device is a human interface device (HID). The partitioning of this system is such that state and computation functions have been removed from the HID and reside on data sources or services. In one embodiment of the invention, one or more services communicate with one or more HIDs through some interconnect fabric, such as a network. An example of such a system is illustrated in FIG. 6. Referring to FIG. 6, the system consists of computational service providers 600 communicating data through interconnect fabric 601 to HIDs 602.

Computational Service Providers—In the HID system, the computational power and state maintenance is found in the service providers, or services. The services are not tied to a specific computer, but may be distributed over one or more traditional desktop systems such as described in connection with FIG. 1, or with traditional servers. One computer may have one or more services, or a service may be implemented by one or more computers. The service provides computation, state, and data to the HIDs and the service is under the control of a common authority or manager. In FIG. 6, the services are found on computers 610, 611, 612, 613, and 614.

Examples of services include X11/Unix services, archived or live audio and video services, Windows NT service, Java™ program execution service, and others. A service herein is a process that provides output data and responds to user requests and input.

Interconnection Fabric—In the invention, the interconnection fabric is any of multiple suitable communication paths for carrying data between the services and the HIDs. In one embodiment the interconnect fabric is a local area network implemented as an Ethernet network. Any other local network may also be utilized. The invention also contemplates the use of wide area networks, the internet, the world wide web, and others. The interconnect fabric may be implemented with a physical medium such as a wire or fiber optic cable, or it may be implemented in a wireless environment.

HIDs—The HID is the means by which users access the computational services provided by the services. FIG. 6 illustrates HIDs 621, 622, and 623. A HID consists of a collection of one or more interface devices, including display 626, a keyboard 624, mouse 625, and audio speakers 627. The HID includes the electronics need to interface these devices to the interconnection fabric and to transmit to and receive data from the services.

Figure 9:
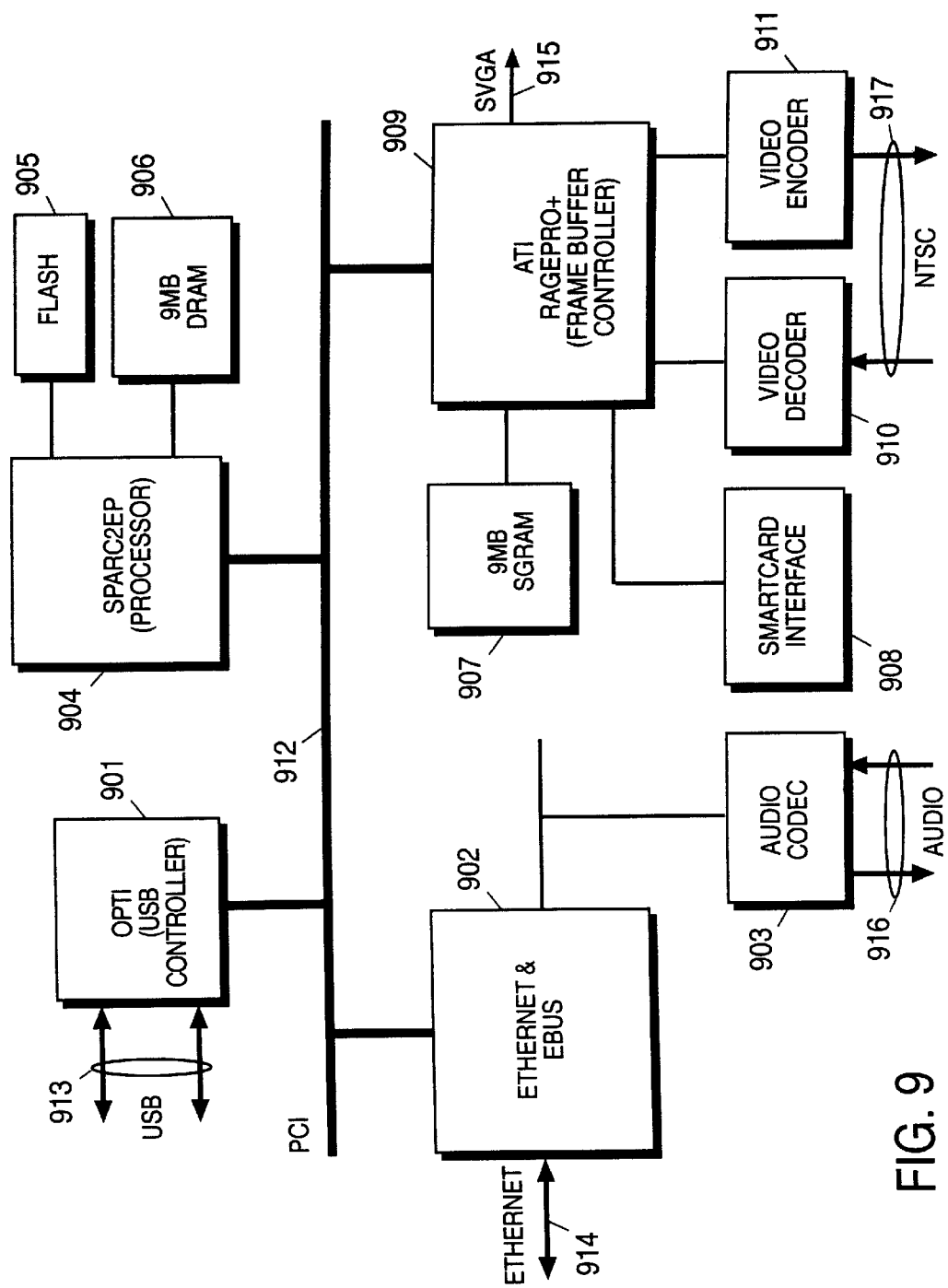
FIG. 9 is a block diagram of an HID device.

A block diagram of the HID is illustrated in FIG. 9. The components of the HID are coupled internally to a PCI bus 912. A network control block 902 communicates to the interconnect fabric, such as an ethernet, through line 914. An audio codec 903 receives audio data on interface 916 and is coupled to block 902. USB data communication is provided on lines 913 to USB controller 901.

An embedded processor 904 may be, for example, a Sparc2ep with coupled flash memory 905 and DRAM 906. The USB controller 901, network controller 902 and embedded processor 904 are all coupled to the PCI bus 912. Also coupled to the PCI 912 is the video controller 909. The video controller 909 may be for example, and ATI RagePro+ frame buffer controller that provides SVGA output on line 915. NTSC data is provided in and out of the video controller through video decoder 910 and video encoder 911 respectively. A smartcard interface 908 may also be coupled to the video controller 909.

The computer systems described above are for purposes of example only. An embodiment of the invention may be implemented in any type of computer system or programming or processing environment.

Thus a method and apparatus for error correction has been described.

What is claimed is:

1. A method configured to correct display errors comprising:
    obtaining a plurality of display commands in a sequence, wherein said plurality of display commands comprise instructions for drawing a display;
    identifying a missing display command;
    requesting current display data for a display location associated with said missing display command.
2. The method of claim 1 further comprising:
    adding an entry to a check-list for said missing command.
3. The method of claim 2 further comprising:
    removing an entry from said check-list when said data associated with said missing command is obtained.
4. The method of claim 3 further comprising:
    replacing data at said display location with said data associated with said missing command.
5. The method of claim 3 further comprising:
    replacing data at said display location with data obtained through the last obtained command associated with said display location.
6. The method of claim 5 further comprising:
    requesting a status check for said missing display command associated with entries in said check-list that are older than a threshold period.
7. The method of claim 6, wherein a command comprises a sequence number, said method further comprising:
    clearing said check-list of all entries up to a particular sequence number.
8. The method of claim 7 further comprising:
    clearing said check-list of all entries when the sequence number for a last command received is larger than a sequence number for said missing command associated with a last entry in said check-list.
9. The method of claim 8 wherein said check-list comprises a sequence counter and the step of identifying a missing command comprises:
    identifying a command's sequence number;
    comparing said sequence number with said sequence counter;
    recording said sequence counter as a value for a missing command sequence, if said sequence number does not correspond to said sequence counter.
10. A method configured to correct display errors comprising:
    obtaining a plurality of display commands in a sequence, wherein said plurality of display commands comprise instructions for drawing said display data;
    monitoring for a display command obtained out of said sequence comprising:
        sending a correction request for one or more missing display commands;
        adding an entry to a check-list corresponding to said one or more missing display commands;
    executing a display command obtained in said sequence;
    clearing an entry from said check-list if said executed command corresponds to said entry in said check-list.
11. The method of claim 10 wherein a command comprises a sequence number and the step of clearing an entry from said check-list comprises:
    clearing said check-list of all entries up to a particular sequence number.
12. The method of claim 11 wherein said check-list comprises a sequence counter and the step of identifying a missing command comprises:
    identifying a command's sequence number;
    comparing said sequence number with said sequence counter;
    recording said sequence counter as a value for said missing command sequence number, if said command's sequence number does not correspond to said sequence counter.
13. A computer program product comprising:
    a computer usable medium having computer readable program code embodied therein configured to correct errors, said computer program product comprising:
    a computer readable code configured to cause a computer to obtain a plurality of display commands in a sequence, wherein said plurality of display commands comprise drawing instructions;
    a computer readable code configured to cause a computer to identify a missing display command;
    a computer readable code configured to cause a computer to request display data at a display location associated with said missing display command.
14. The computer program product of claim 13 further comprising:
    a computer readable code configured to cause a computer to add an entry to a check-list for said missing command.
15. The computer program product of claim 14 further comprising:
    a computer readable code configured to cause a computer to remove an entry from said check-list when said data associated with said missing command is obtained.
16. The computer program product of claim 15 further comprising:
    a computer readable code configured to cause a computer to replace data at said display location with said data associated with said missing command.
17. The computer program product of claim 16 further comprising:

a computer readable program code configured to cause a computer to request a status check for missing commands associated with entries.

18. The computer program product of claim 17 further comprising:

a computer readable code configured to cause a computer to request a status check for missing commands associated with entries in said check-list that are older than a threshold period.

19. The computer program of claim 18, wherein each command comprises a sequence number, said computer program product further comprising:

a computer readable code configured to cause a computer to clear all entries in said check-list up to a particular sequence number.

20. The computer program product of claim 19 further comprising:

a computer readable code configured to cause a computer to clear said check-list of all entries when a sequence number for a last command received is larger than a sequence number for a missing command associated with a last entry in said check-list.

21. The computer program product of claim 19, wherein said check-list comprises a sequence counter, said computer program product further comprising:

a computer readable code configured to cause a computer to identify a command's sequence number;

a computer readable code configured to cause a computer to compare said sequence number with a sequence counter;

a computer readable code configured to cause a computer to record said sequence counter as a value for a missing command sequence, if said sequence number does not correspond to said sequence counter.

22. A computer program product comprising a computer usable medium having computer readable program code embodied therein configured to correct display errors, said computer program product comprising:

a computer readable code configured to cause a computer to obtain a plurality of display commands in a sequence, wherein said plurality of display data comprises instructions for drawing said display data;

a computer readable code configured to cause a computer to monitor for a command obtained out of said sequence comprising:
sending a correction request for one or more missing commands;
adding an entry to a check-list corresponding to said one or more missing commands;

a computer readable code configured to cause a computer to execute a command obtained in said sequence;

a computer readable code configured to cause a computer to clear an entry from said check-list of entries up to said executed command's sequence number if said executed command corresponds to said entry in said check-list.

23. The computer program product of claim 22, wherein a command comprises a sequence number, said computer program product further comprising computer readable code configured to cause a computer to clear all entries of said check-list up to a particular sequence number.

24. The computer program product of claim 23, wherein said checklist comprises a sequence counter, said computer program product further comprising:

a computer readable code configured to cause a computer to identify a command's sequence number;

a computer readable code configured to cause a computer to compare said sequence number with said sequence counter;

a computer readable code configured to cause a computer to record said sequence counter as a value for a missing command sequence, if said sequence number does not correspond to said sequence counter.

25. A method configured to correct display errors comprising:

assembling display data into a command;

incrementing a sequence counter;

associating said sequence counter with said command;

transmitting said sequence counter and said command to a display unit;

preserving and updating a true copy of said display data;

accepting correction requests from said display unit regarding a missing command;

identifying a display location associated with said missing command;

retrieving from said true copy current data for said display location;

transmitting a new command containing said current data.

26. A computer program product comprising a computer usable medium having computer readable program code embodied therein configured to correct display errors, said computer program product comprising:

computer readable program code configured to cause a computer to assemble display data into a command;

computer readable program code configured to cause a computer to increment a sequence counter;

computer readable program code configured to cause a computer to associate said sequence counter with said command;

computer readable program code configured to cause a computer to transmit said sequence counter and said command to a display unit;

computer readable program code configured to cause a computer to preserve and update a true copy of said display data;

computer readable program code configured to cause a computer to accept correction requests from said display unit regarding a missing command;

computer readable program code configured to cause a computer to identify a display location associated with said missing command;

computer readable program code configured to cause a computer to retrieve from said true copy current data for said display location;

computer readable program code configured to cause a computer to transmit a new command containing said current data.

* * * * *

UNITED STATES PATENT AND TRADEMARK OFFICE
CERTIFICATE OF CORRECTION

PATENT NO. : 6,230,296 B1
DATED : May 8, 2001
INVENTOR(S) : James G. Hanko

Page 1 of 1

It is certified that error appears in the above-identified patent and that said Letters Patent is hereby corrected as shown below:

Column 9,
Line 45, should read -- The method of claim 1 further comprising: --

Column 12,
Line 1, should read -- The computer program product of claim 22, --

Signed and Sealed this

Ninth Day of April, 2002

Attest:

JAMES E. ROGAN
Attesting Officer
Director of the United States Patent and Trademark Office